Oct. 18, 1966
R. J. GHIRINGHELLI
3,280,255
SWITCHING ADAPTER
Filed Feb. 5, 1963

INVENTOR.
ROBERT J. GHIRINGHELLI
BY Robert H. Henderson
ATTORNEY

United States Patent Office 3,280,255

Patented Oct. 18, 1966

3,280,255
SWITCHING ADAPTER

Robert J. Ghiringhelli, Elmhurst, N.Y., assignor to The Western Union Telegraph Company, New York, N.Y., a corporation of New York Filed Feb. 5, 1963, Ser. No. 256,416
3 Claims. (Cl. 178—71)

Figure 1:
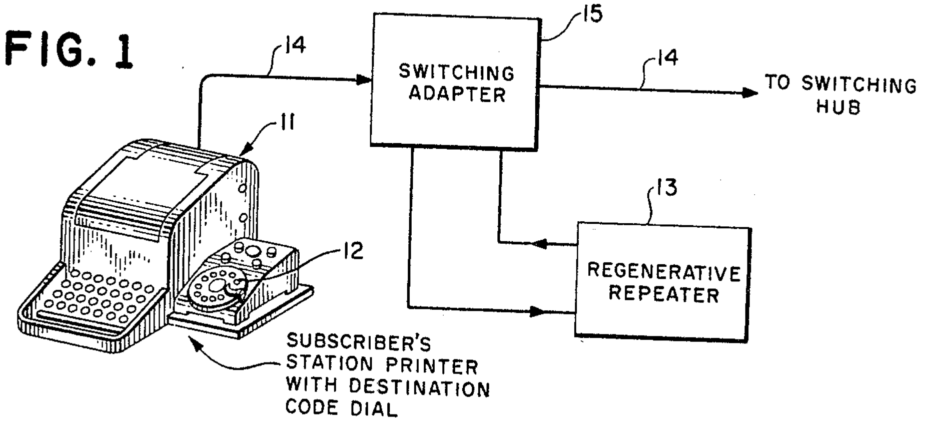

This invention relates to the printing telegraph, and more particularly to a novel adapter for use therewith whereby station selection signals that are transmitted from a calling dial may be sent directly to the line without regeneration.

It is common to use regenerative repeaters in such telegraph lines for the purpose of amplifying and re-shaping the intelligence pulse signals after their attenuation and distortion due to passage over a length of telegraph line. It is undesired, however, that dialing impulses be so treated, and for their accommodation on the same wires, the instant invention is provided as an attachment for the regenerative repeater such that dialing impulses are bypassed around the repeater, although intelligence signal pulses are regenerated therein.

This I accomplish by means of a bypass device wherein sensing elements responsive to the polarity and the duration of the polarity of both the sending and the receiving segments of the telegraph line are effective to combine the information thus received to transfer the code signals either around an existing regenerative amplifier, or through it for amplification and regeneration, according to whether the said signals comprise destination code dialing pulses, for example, or intelligence signal pulses, respectively. It should be understood, however, that the application of this invention is not limited to the accommodation of dial code pulses, but extends to any instance where the control of direct current signals is desired in a circuit otherwise used for intelligence signals, as, for example, in circuit switching applications and otherwise wherever instruction signals of definite polarity are to be used in connection with a duplex repeatering operation.

It is therefore an object of the present invention to provide an attachment for the regenerative repeater of a printing telegraph circuit whereby only line switching destination code signals are bypassed around the repeater.

It is another object of the invention to provide such a device wherein no modification of the repeater is required to adapt it for use therewith.

It is still another object of the invention to provide such a device constructed of components having substantially extended service life.

It is a further object that such components shall be essentially non-dissipative of heat and require no external means of cooling.

Still another object is to provide such a device which comprises a compact and inconspicuous unitary assembly.

An important object is protection of the destination control function in such a device from disruption by adventitious splits and hits.

The means whereby I accomplish the foregoing and other objects comprises solid state line-sensing circuitry having time responsive and polarity responsive capabilities, and effective to actuate a contained switching mechanism for repeater bypass.

Figure 2:
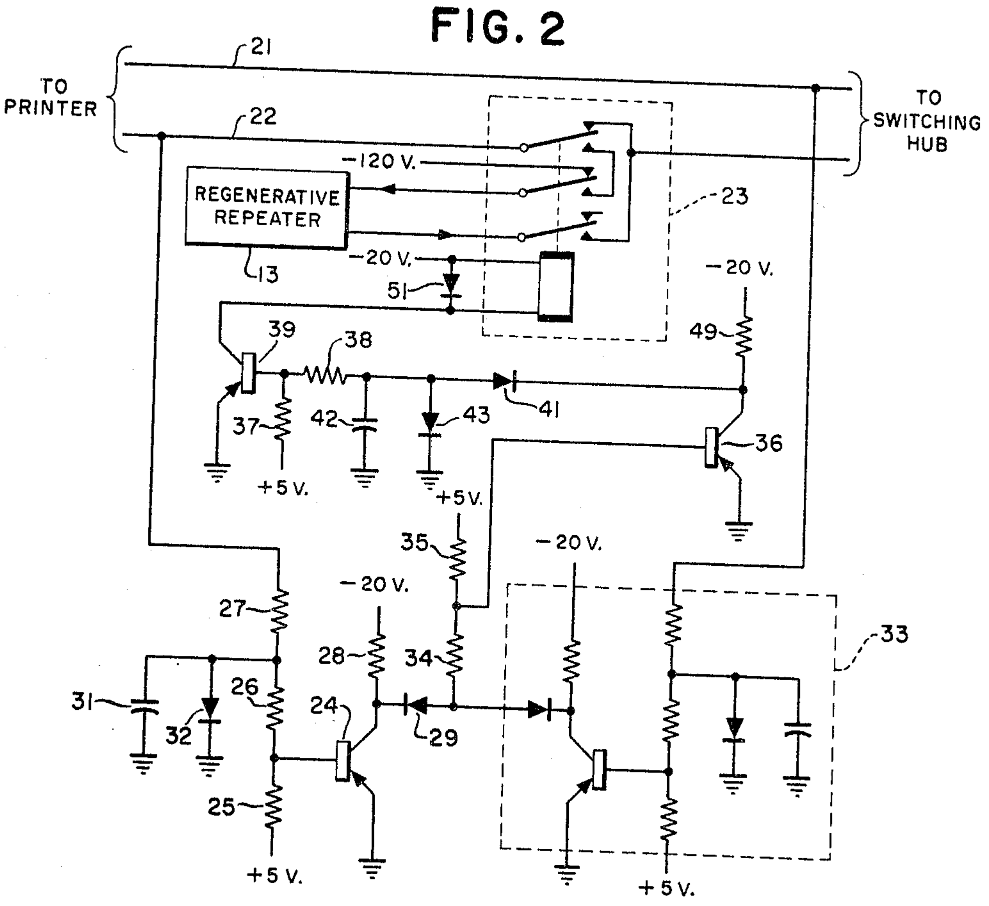

A clearer understanding of the invention may be had by reference to the attached drawings of the preferred embodiment of a specific illustrative example of the instant invention, wherein:

FIG. 1 is a block diagram of an outstation printer employing the instant invention; and FIG. 2 is a wiring diagram of the instant invention comprising a portion of FIG. 1.

Turning now to the drawings, there is seen in FIG. 1 a conventional printing telegraph machine 11 having as a part thereof the destination code dialing device 12 whereby the subscriber may command the circuit switching hub to connect his machine to any of a catalogued list of other subscribers.

A regenerative repeater 13 normally is connected into the telegraph channel 14 leading from the switching hub to the printer 11 at times when telegraph messages are being received, in order to extend the reliable operating range of the system to more remote geographical areas, but since repeater 13 is not well adapted to the passage of dial code pulses, which are of different character and repetition rate than the telegraph code, the switching adapter 15 comprising the instant invention, is employed in conjunction therewith.

It will be understood that the channel 14 may comprise a carrier channel, and that the configuration of FIG. 1 may include a repeater in such channel and joining remote switching centers.

In FIG. 2, it is seen that the telegraph channel 14 comprises two wires 21 and 22, in the latter of which there is inserted a relay 23 controllable in the manner to be described.

A transistor 24 of the p-n-p type (as are all hereafter mentioned) has a grounded emitter and a base energizable from a potential from the voltage divider comprising resistors 25, 26, and 27 connected between five volts positive power supply, and the line 22. Thus, at times when line 22 is strongly negative, a proper selection of such voltage divider resistors will cause the base of transistor 24 to assume a negative potential, the transistor to saturate through its limiting resistor 28 and its collector-connected diode 29 to block. A capacitor 31 in conjunction with the resistor 27 provides an advantageous time constant delaying the establishment of this condition, upon line 22 suddenly going negative, while polarity in the reverse direction upon the line going positive is prevented from actuating transistor 24 by the shunting action of diode 32. Capacitor 31 and diode 32 act as a transient impulse decoupling or bypass means.

Identical results are provided by the circuit 33, which, however, is controlled by connection to the line 21.

Resistor 34 supplies a current path through a diode such as 29, and a resistor such as 28 if either line wire 21 or 22 is positive, so that its junction with resistor 35 then applies base current to saturate the transistor 36 connected thereto, thereby preventing a flow of current through the voltage divider comprising resistors 37 and 38, between +5-volt supply and ground, to apply positive base to transistor 39, thus holding it to the nonconducting condition and its connected relay 23 in the released state.

Only if both lines 21 and 22 are negative, as is the case when the system is in a receptive condition for telegraphic transmission, do both transistors such as 24 saturate causing positive bias to be applied to the base of transistor 36.

Transistor 36 is thereby cut off, and a flow of current through resistor 49 and through the diode 41 initiated whereby the capacitor 42 is ultimate charged to a negative potential, which is applied through resistor 38 to the base of transistor 39 to saturate it and energize relay 23 connected thereto. Such energization of relay 23 is clearly seen to connect repeater 13 into the line 22, to disconnect line 22 through the relay, and remove the bsas of −120 volts from repeater 13 which had been applied thereto in order to deactivate it while it was disconnected from the line.

The period of delay in thus energizing relay 23 which is introduced by the charging time of the capacitor 42 is desirable in preventing the repeater 13 from being connected to or disconnected form the line due to sudden accidental voltages which may occasionally occur on the lines by reason of induction, atmospherics, or other causes. It will be seen that by this means, protection of a telegraphic transmission from disconnection of the repeater by hits, which comprise adventitious brief line potentials, is avoided while direct current switching code pulses are prevented from entering the repeater.

Although this invention has been described in terms of a specific illustrative example thereof, it will be apparent that various modifications and elaborations thereof will occur to those skilled in the art which do not however, depart from the essential spirit of the invention, and it is therefore intended that the invention be limited only by the appended claims.

What is claimed is:

1. Means for bypassing dialing pulses around a repeater in a two-wire telegraph line which comprises: resistor potential dividing means connecting each wire to ground, desensitizing filters on each of said means consisting of bypass means for shunting to ground transient impulses of disruptive nature connected to said dividing means, a coincidence circuit for giving a polarized output, comprising a pair of grounded base transistors having a pair of diodes back-to-back interconnecting their collectors, and having inputs connected to said dividing means respectively, polarity responsive delay means connected to said coincidence circuit for providing a delayed output response only when there occurs a coincidence of negative polarity on both of the said line wires, and relay means connected to the delay means for bypassing the repeater.

2. Bypassing means for a repeater in a two-wire telegraph line which comprises: resistors connected to each of the said wires and in a circuit to ground, a first pair of grounded emitter transistors having their collectors interconnected by a first pair of diodes arranged back-to-back and having their bases connected respectively to the ends of said resistors which are electrically remote from said wires a clamping diode and a shunting condenser bypassing to ground the said remote ends of each of the said resistors, and a transistor amplifier having a base connected to the junction of said diodes for effecting amplifier saturation only upon blocking of both of said first pair of transistors due to negative potential on both of said telegraph line wires, a delay circuit having a capacitor and a charging resistor for the slow charging thereof to a predetermined final voltage under an input voltage of one polarity, and a diode for the immediate discharging thereof by an input voltage of a different polarity, and relay means controlling a switching means, the said relay means being responsive to the output of said delay circuit for switching the repeater in and out of the line.

3. Means for bypassing dial pulses around a repeater in a two-wire telegraph line during periods when both wires retain a negative potential with respect to ground, which comprises a pair of resistors each connected to one of the said wires and having a value adapted to limit the flow of ground current therethrough to a relatively small value a first pair of transistors in grounded emitter configuration, having inputs which are each normally positively biased beyond cutoff by a high impedance source, but which are each serially connected for passing the said ground current from a said line wire under the condition of negative wire polarity to cause transistor output current saturation transient impulse decoupling means connected to the input circuit of each of the said first pair of transistors respectively and comprising a shunt capacitor for bypassing negative impulses to ground, and a shunt diode for bypassing positve ground current a logic nand circuit comprising a third transistor and a pair of diodes which are connected to the said first pair of transistors for producing a negative-going output upon coincidence of a negative condition on each of said line wires a delay circuit connected to the output of said nand circuit and comprising a fourth transistor having resistive voltage divider means on the input thereof for normal biasing of the said fourth transistor to cutoff, said means comprising a diode switch connected to said voltage divider for causing immediate saturation of said fourth transistor upon occurrence of negative delay circuit input, a capacitor connecting said voltage divider means to ground for delaying the development of transistor cutoff bias upon diode switch opening, and a diode bypassing said capacitor for voltage divider current transmission to ground, and relay means connected to said delay circuit and to said telegraph line and to said repeater.

References Cited by the Examiner

UNITED STATES PATENTS

| | | | |
|---|---|---|---|
| 2,658,945 | 11/1953 | Bramhall et al. | 178—70 |
| 3,007,000 | 10/1961 | Newell | 178—70 |
| 3,038,035 | 6/1962 | Davey | 178—73 |

FOREIGN PATENTS

| | | |
|---|---|---|
| 161,535 | 2/1955 | Australia. |

NEIL C. READ, *Primary Examiner.*

ROBERT H. ROSE, *Examiner.*

A. J. DUNN, T. B. HABECKER, *Assistant Examiners.*